US008451353B1

(12) United States Patent
Bloom et al.

(10) Patent No.: US 8,451,353 B1
(45) Date of Patent: May 28, 2013

(54) MULTIPLE-LINEAR-ARRAY MEMS DISPLAY CHIPS

(75) Inventors: David M Bloom, Jackson, WY (US); Matthew A Leone, Jackson, WY (US)

(73) Assignee: Alces Technology, Inc., Jackson, WY (US)

( * ) Notice: Subject to any disclaimer, the term of this patent is extended or adjusted under 35 U.S.C. 154(b) by 62 days.

(21) Appl. No.: 13/291,867

(22) Filed: Nov. 8, 2011

(51) Int. Cl.
*H04N 3/12* (2006.01)
*B41J 2/47* (2006.01)

(52) U.S. Cl.
USPC ............................. 348/294; 347/255; 347/239

(58) Field of Classification Search
CPC .................................. B41J 2/47; G02B 26/0808
USPC ............. 345/84, 85; 347/239, 255; 348/294; 359/295
See application file for complete search history.

(56) References Cited

U.S. PATENT DOCUMENTS

| 6,476,848 | B2 * | 11/2002 | Kowarz et al. | 347/255 |
| 6,967,758 | B2 * | 11/2005 | Amm et al. | 359/237 |
| 7,054,051 | B1 | 5/2006 | Bloom | |
| 7,286,277 | B2 | 10/2007 | Bloom | |
| 7,940,448 | B2 | 5/2011 | Bloom | |
| 8,199,178 | B1 * | 6/2012 | Payne | 347/239 |

* cited by examiner

*Primary Examiner* — David N Spector
(74) *Attorney, Agent, or Firm* — NUPAT, LLC; Morrison Ulman

(57) ABSTRACT

Single-chip, multiple-linear-array MEMS form the basis for high-resolution, high-frame-rate video displays.

19 Claims, 15 Drawing Sheets

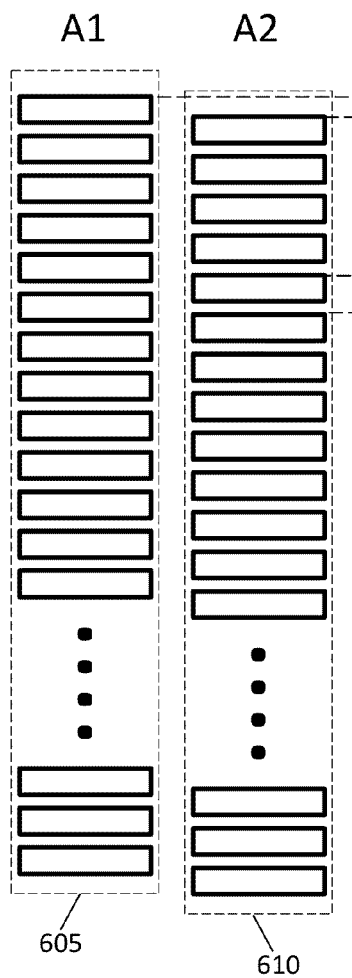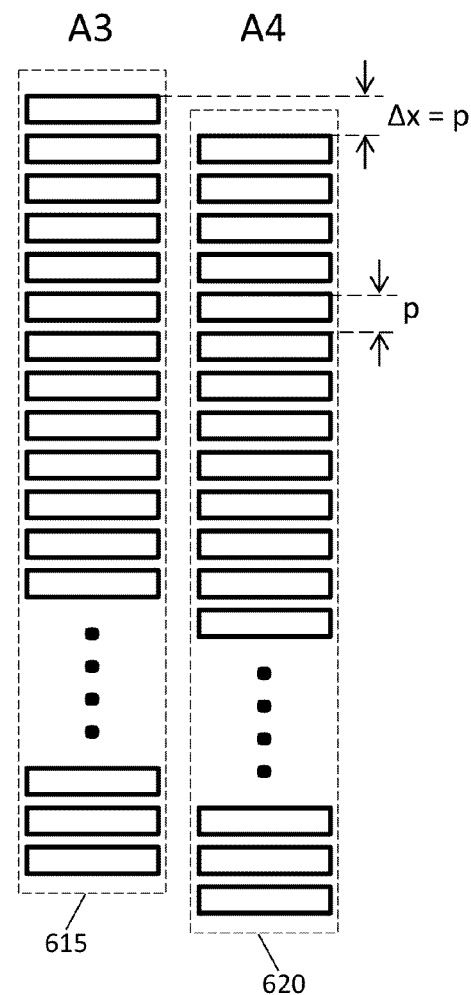
Fig. 6A
Fig. 6B

FIELD 1

FIELD 2

MULTIPLE-LINEAR-ARRAY MEMS DISPLAY CHIPS

TECHNICAL FIELD

The disclosure is generally related to linear-array MEMS (micro-electromechanical systems) display chips.

BACKGROUND

Linear arrays of miniature light modulators form the basis for a broad family of MEMS-based video displays. These displays form line images that are swept back and forth to "paint" two-dimensional scenes. FIGS. 1A-1C show display system concepts for a linear array MEMS display.

In FIGS. 1A-1C, light source 105 illuminates MEMS linear array 115 through lens 110. Array 115 is shown schematically, and enlarged, in inset 120. Elements 116, 117 and 118 are just a few of the light modulator elements that form the array. Array 115 may operate in transmission or reflection. For example, one type of linear array light modulator is formed from thousands of reflective micro-electromechanical ribbons arranged in a single column.

Array 115 imparts phase information onto a narrow strip of light. Optical system 125 then converts the phase information into amplitude variations to form a line image. Scan mirror 130 scans a line image 135 across a screen such as screen 140 shown in FIG. 1B. The line image is scanned fast enough that the scanning motion is not noticeable to the human eye. Scanned line images on screen 140 provide a full video experience.

Optical system 125 may take different forms which are complementary to different methods of encoding phase information with array 115. Some examples of such optical systems are presented in U.S. Pat. No. 7,054,051 ("Differential interferometric light modulator and image display device"), U.S. Pat. No. 7,286,277 ("Polarization light modulator") and U.S. Pat. No. 7,940,448 ("Display system").

One of the properties of MEMS light modulators which enables their use in linear array display systems like that of FIGS. 1A-1C is their high speed. The two-dimensional image formed on screen 140 is updated many times per second, and each two-dimensional image is formed by successive line images, each different from the next. A change from one line image to another requires reconfiguring linear array elements. The time available to do this is called a "column time". High resolution video displays put extreme requirements on MEMS switching speed as the column time available is short.

Consider, for example, a "4K" video display having 4096 columns by 2160 rows of pixels. If the display operates at 196 frames per second, and is reconfigured to display red, green and blue information sequentially on a column by column basis, then the amount of time that the linear array remains in any particular configuration is only a few hundred nanoseconds.

As resolution requirements become even greater and the desired number of frames of video information per second also increases, the time available to reconfigure a linear array for each new column (i.e. each new line image) becomes a limiting factor. Of course, in the example above, one could turn the display chip on its side and use an array with 4096 elements to generate 2160 columns, but that strategy requires a display chip twice as long, using up valuable wafer real estate.

Hence, what are needed are linear-array MEMS display chips that can provide high-resolution, high-frame rate video.

BRIEF DESCRIPTION OF THE DRAWINGS

FIGS. 6A and 6B show along-array offsets for a double-linear-array MEMS light modulator chip.

DETAILED DESCRIPTION

Multiple-linear-array MEMS display chips, and methods for operating them, are described below. Chips that have more than one linear array light modulator offer a way to build single-chip, high-resolution display systems. Multiple linear arrays on a single chip also lead to better optical power handling, higher display brightness and wider color gamut.

Double-linear-array chips may be used to improve resolution in monochrome or full color displays. Along-array offsets between two arrays may be used to improve resolution in monochrome displays, for example. When three-color illumination is used, one array modulates one of the three colors, while the second array modulates the other two colors. Humans have better visual acuity at, and are more sensitive to, green than red or blue. Hence a double-linear-array chip may use one array to modulate green and the other array to modulate red and blue.

A triple-linear-array chip provides one array for each of three illumination colors while a quadruple-linear-array chip may be illuminated by four colors for a wider color gamut, higher brightness, or both. Single-level wiring schemes for double-, triple-, and quadruple-linear-array chips mean that only layout, rather than process flow, changes are required to transition from single- to multiple-linear-array chip production. Displays based on linear-array light modulators produce line images. The line images are scanned to produce what appears to human observers to be two-dimensional images with rows and columns of pixels. As a line image is scanned from one column position to the next, the linear array light modulator changes configuration to create the new column of pixels.

When line images from two or more linear-array light modulators are scanned by a single scan mirror, the line images are separated in the resulting apparent two-dimensional image. A signal delay may be applied to column data for different colors to compensate for the spatial separation of arrays on a multi-array chip. Similarly, when one array modulates two colors, the delay between the time that the array is configured for the first and second colors leads to a separation of the corresponding line images. Separating illumination light on the linear array can compensate for this effect so that columns of each color are lined up in a two-dimensional image.

Various methods for operating multiple-linear-array display chips offer tradeoffs among resolution and available column time, among other parameters. In some cases two arrays are used to modulate three colors, for example. One way to have a single array modulate both red and blue information is to have the line image from that array alternate between red and blue columns. This omits half of the red and blue information from displayed images, but surprisingly the omission may not be particularly noticeable.

Figure 1A:
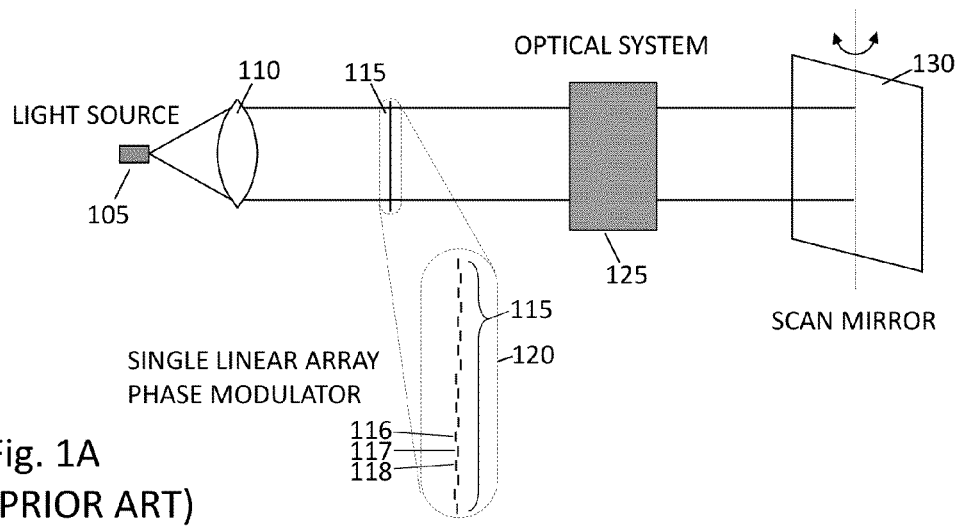
FIGS. 1A-1C show display system concepts for a linear array MEMS display.
Figure 1B:
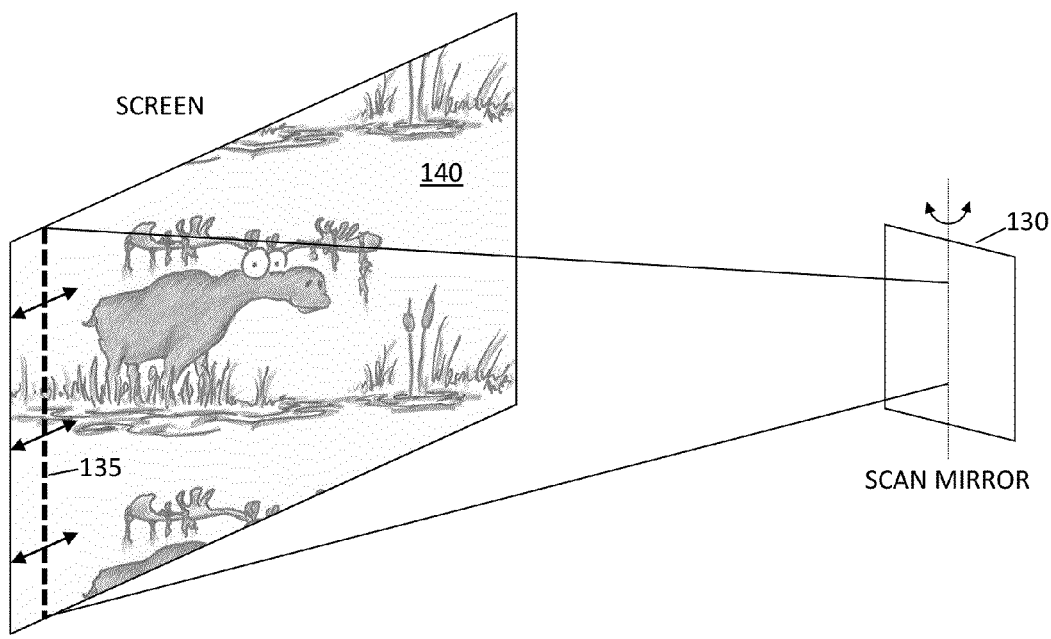
Figure 1C:
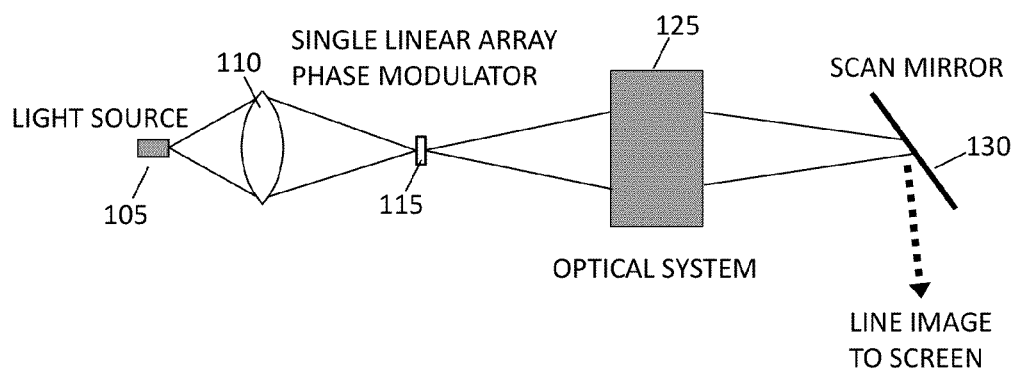
Figure 2A:
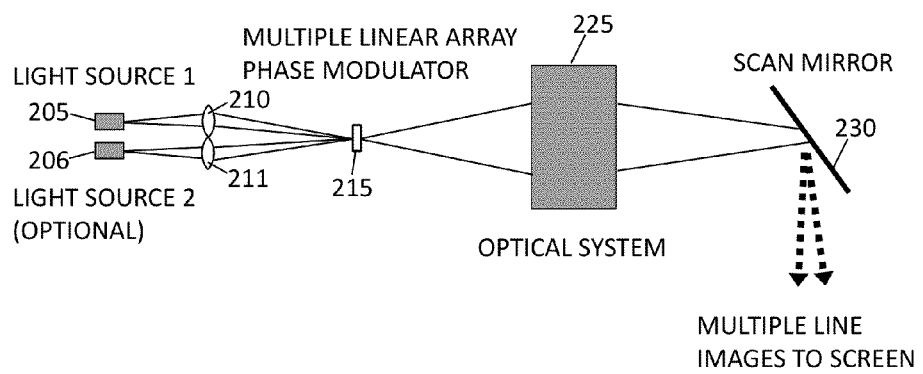
FIGS. 2A and 2B show display system concepts for a multiple-linear-array MEMS display.
Figure 2B:
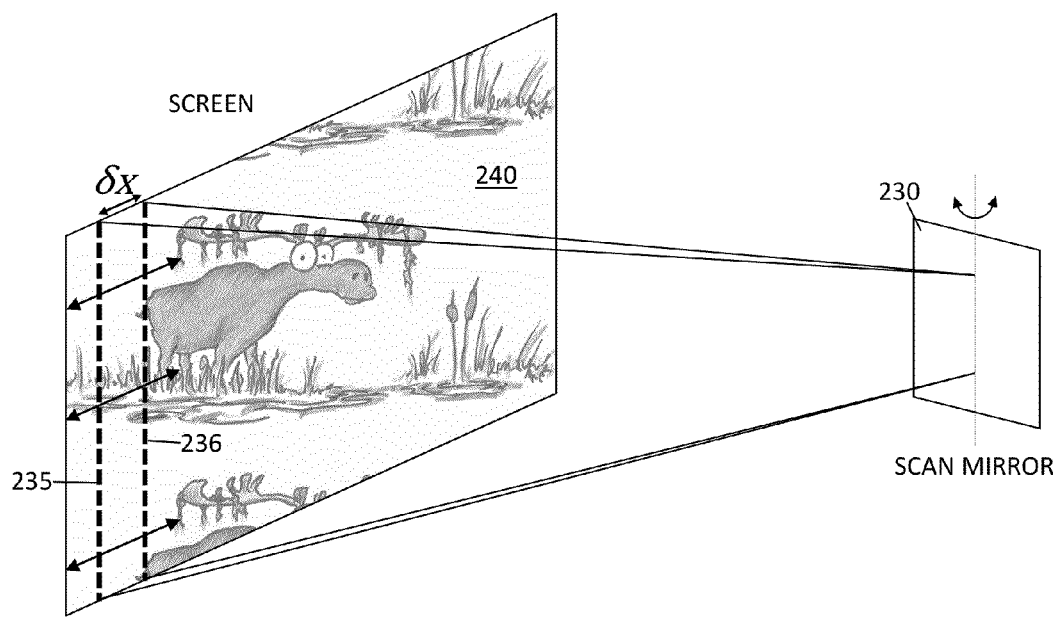

These and other aspects of multiple-linear-array MEMS display chips are now discussed in greater detail. FIGS. 2A and 2B show display system concepts for a multiple-linear-array MEMS display. FIGS. 2A and 2B are similar to FIGS. 1A-1C except that the display system of FIGS. 2A and 2B includes a multiple-linear-array MEMS light modulator chip.

In FIG. 2A, light source 205 illuminates MEMS multiple-linear-arrays 215 through lens 210. Optional light source 206 illuminates MEMS multiple-linear-arrays 215 through lens 211. Additional light sources, not shown, may also illuminate MEMS multiple-linear-arrays 215. Examples of multiple-linear-arrays 215 are discussed in detail below, especially in connection with FIGS. 3-8. Such arrays may operate in transmission or reflection; however, most of the discussion is in terms of linear arrays of reflective MEMS ribbons.

Multiple-linear-arrays 215 impart phase information onto narrow strips of light. Optical system 225 then converts the phase information into amplitude variations to form line images. Scan mirror 230 scans line images, e.g. 235, 236, across a screen such as screen 240 shown in FIG. 2B. The line images are scanned fast enough that the scanning motion is not noticeable to the human eye. Scanned line images on screen 240 provide a full video experience.

Optical system 225 may take different forms which are complementary to different methods of encoding phase information with arrays 215. Some examples of such optical systems are presented in U.S. Pat. No. 7,054,051 ("Differential interferometric light modulator and image display device"), U.S. Pat. No. 7,286,277 ("Polarization light modulator") and U.S. Pat. No. 7,940,448 ("Display system").

Line images 235, 236 from arrays 215 appear separated on screen 240 by an amount labeled "δx" in the figure. At any given time line images 235 and 236 represent different columns of a two-dimensional image that appears on screen 240. Therefore image data corresponding to a single column of a two-dimensional image is sent to different linear arrays in a multi-array system at different times.

Figure 3:
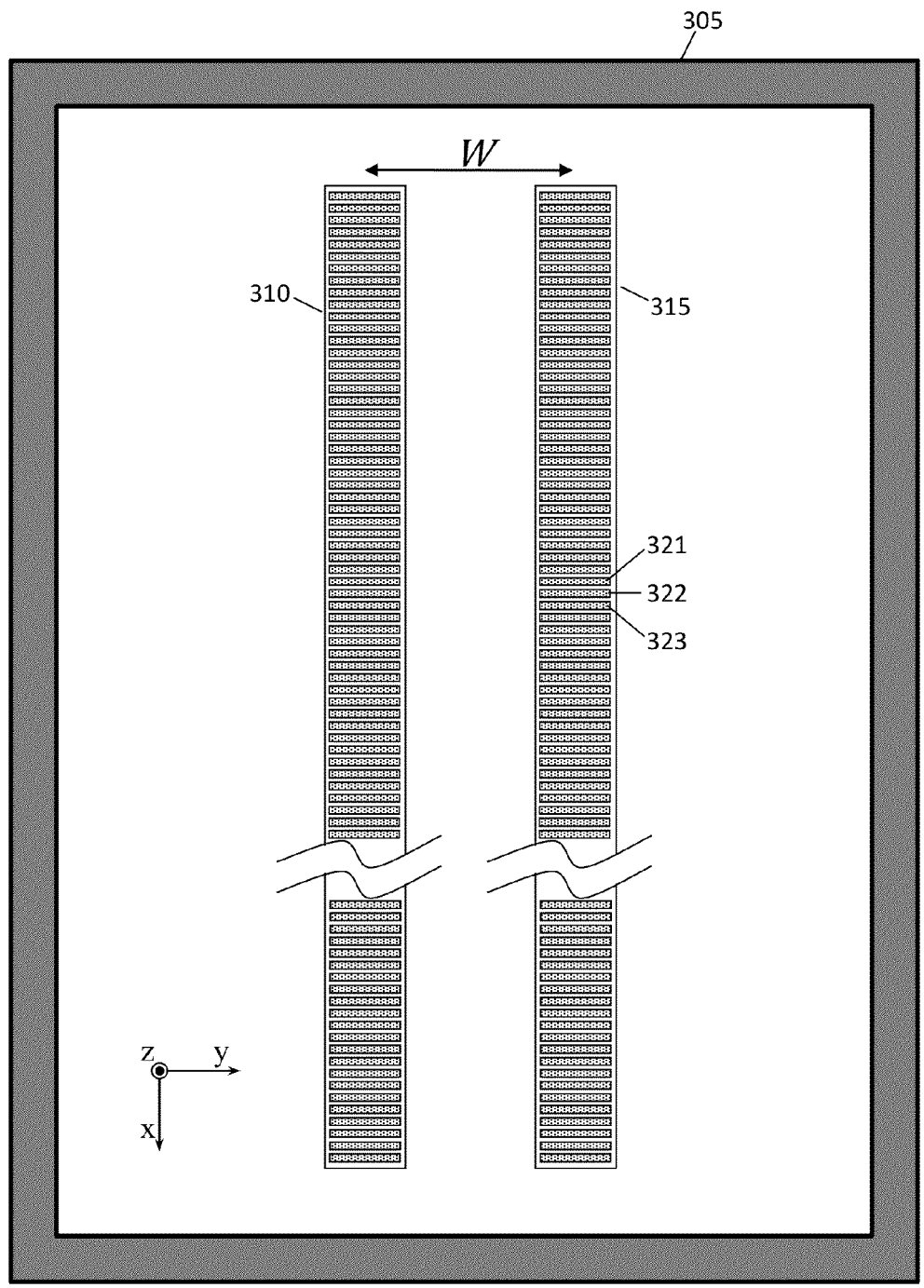
FIG. 3 shows a double-linear-array MEMS light modulator chip.

FIG. 3 shows a double-linear-array MEMS light modulator chip 305. Chip 305 includes two linear arrays, 310 and 315, of MEMS light modulator elements such as elements 321, 322 and 323. The elements of the arrays may be reflective or transmissive light modulators such as liquid crystals or MEMS mirrors have either piston or tilt motion; however, most of the discussion of array elements is directed toward reflective MEMS ribbons such as those discussed in connection with FIG. 4 below. Only a few dozen elements per array are shown in FIG. 3; however, actual arrays may have as many as several thousand elements.

In FIG. 3, linear arrays 310 and 315 are separated from one another by a distance, W, in the y direction, perpendicular to the longest array dimension. Array separation W is larger than one pixel and leads to separation between line images scanned from chip 305. This is shown as δx in FIG. 2B. In fact, W=δx when both are measured in image pixels.

Figure 4A:
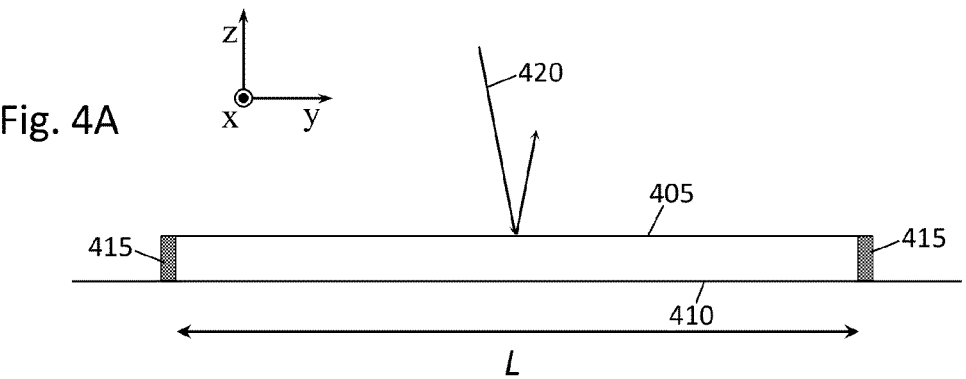
FIGS. 4A-4C show MEMS ribbon modulators.
Figure 4B:
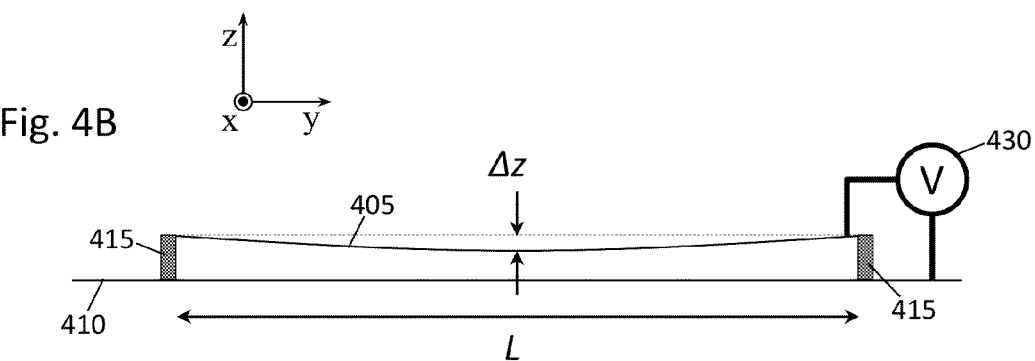
Figure 4C:
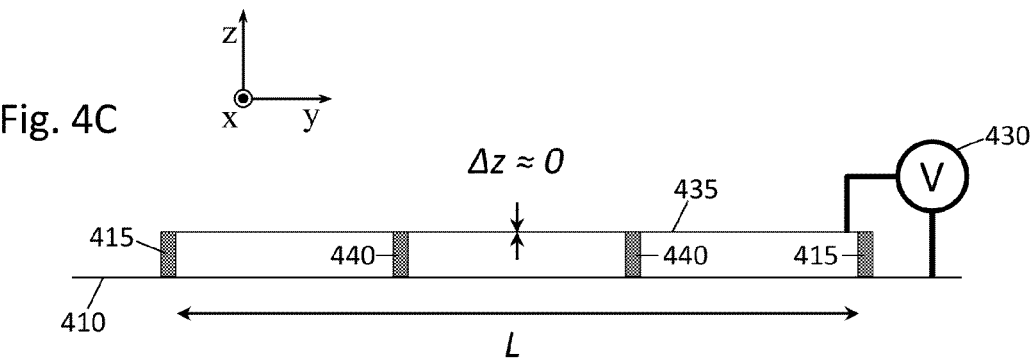

FIGS. 4A-4C show MEMS ribbon modulators that may be used as the elements of arrays such as 310 and 315. These ribbon modulators change the phase of light reflected from them depending on voltage applied between the ribbon and a substrate. FIGS. 4A and 4B show a MEMS ribbon modulator in relaxed and deflected states, respectively. FIG. 4C shows a MEMS ribbon structure that does not deflect even when a voltage is applied to it.

In FIG. 4A MEMS ribbon 405 is supported at its ends by support posts 415 over substrate 410. Several processes for creating MEMS ribbons have been described elsewhere. Typical ribbons are etched from a layer of silicon nitride and made highly reflective by coating with aluminum. A typical ribbon may be between about 50 µm and about 500 µm long, between about 1 µm and about 20 µm wide, and between about 0.05 µm and 2 µm thick although these dimensions may vary significantly. Arrows 420 represent light reflecting from the surface of ribbon 405.

FIG. 4B shows the ribbon of FIG. 4A with addition of voltage source 430 which creates a potential difference between ribbon 405 and substrate 410. A voltage applied between ribbon and substrate causes the ribbon to deflect toward the substrate by an amount Δz, as shown in the figure. The phase of light reflected by ribbon 405 in its deflected state (FIG. 4B) versus its relaxed state (FIG. 4A) is given by where φ is the phase, Δz is the ribbon deflection and λ is the wavelength of light. Phase modulation caused by ribbon deflection is converted to amplitude modulation by an optical system such as 225 in FIG. 2A.

FIG. 4C shows a ribbon similar to that of FIGS. 4A and 4B with the exception of additional support posts 440. Additional support posts 440 prevent ribbon 435 from deflecting even when a voltage is applied between the ribbon and the substrate by voltage source 430. As discussed below in connection with FIG. 9, supported, fixed ribbons like 435 in FIG. 4C may be used as conductors to carry voltages to other ribbons in single-layer wiring schemes for multiple-linear-array chips.

Figure 5:
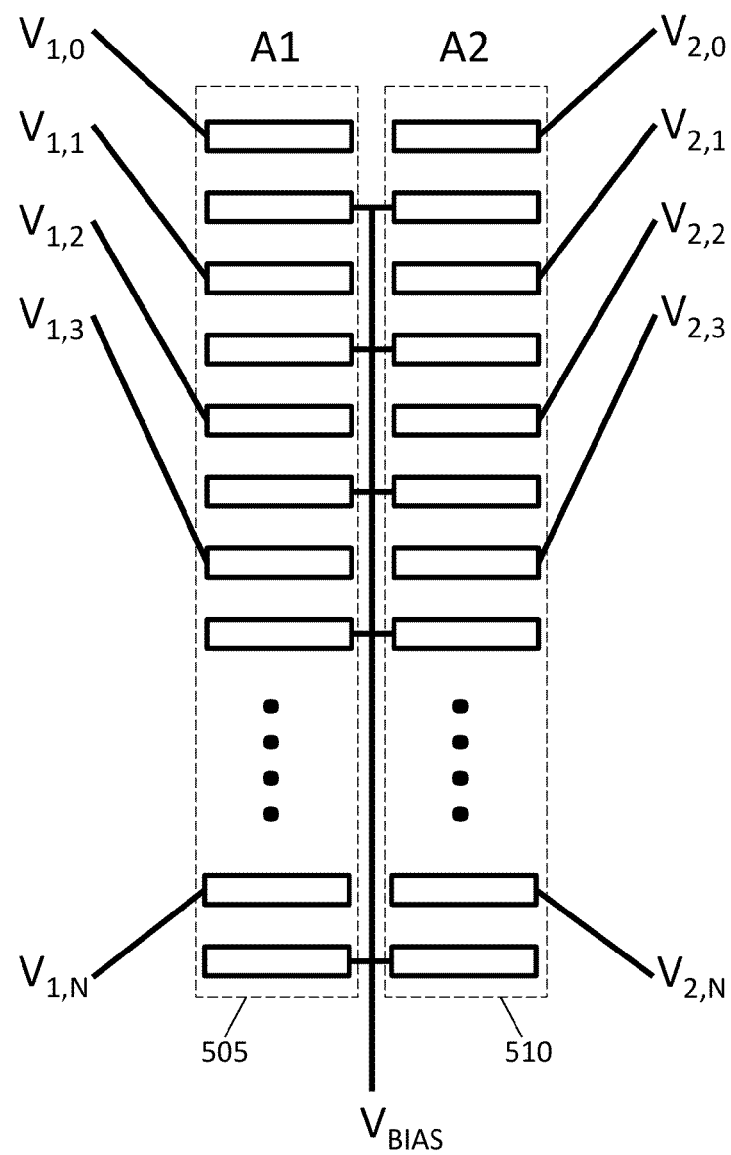
FIG. 5 shows a single-layer wiring scheme for a double-linear-array MEMS light modulator chip.

FIG. 5 shows a single-layer wiring scheme for a double-linear-array MEMS light modulator chip. In FIG. 5, linear array A1 includes ribbons that appear within dashed rectangle 505 while linear array A2 includes ribbons that appear within dashed rectangle 510. (The spacing between ribbons in the arrays shown in FIG. 5 is exaggerated for clarity.) Every other ribbon is arrays A1 and A2 is connected to a bias voltage, $V_{BIAS}$. The remaining ribbons are connected to individual signal lines that carry voltages $V_{1,0}$, $V_{1,1}$, $V_{2,0}$, etc. Here $V_{X,Y}$ is a signal for ribbon Y in array AX. Each ribbon connected to an individual signal line can be deflected independently, while those connected to $V_{BIAS}$ move together. The single layer wiring scheme permits fabrication of double-linear-arrays on chips using processes designed for single linear arrays. Only layout, rather than process flow, changes are required as all wiring is created in the same process step. The single layer wiring scheme provides a direct connection to each passive ribbon without switching or multiplexing elements.

FIGS. 6A and 6B show along-array offsets for a double-linear-array MEMS light modulator chip. In FIG. 6A, arrays A1 and A2 include ribbons enclosed by dashed rectangles 605 and 610, respectively. In FIG. 6B, arrays A3 and A4 include ribbons enclosed by dashed rectangles 615 and 620, respectively.

Arrays A1 and A2 are offset from each other, in the direction of the longest array dimension, by an amount Ax equal to one-half the ribbon pitch, p/2. Arrays A3 and A4 are offset by one ribbon pitch, p. Along-array offsets such as those depicted in FIGS. 6A and 6B may be used in some multi-linear-array chips as a way of increasing image resolution. A pair of offset arrays can be used to increase the resolution of a single array in the direction of the longest array dimension by doubling the number of addressable points in an image.

Figure 7:
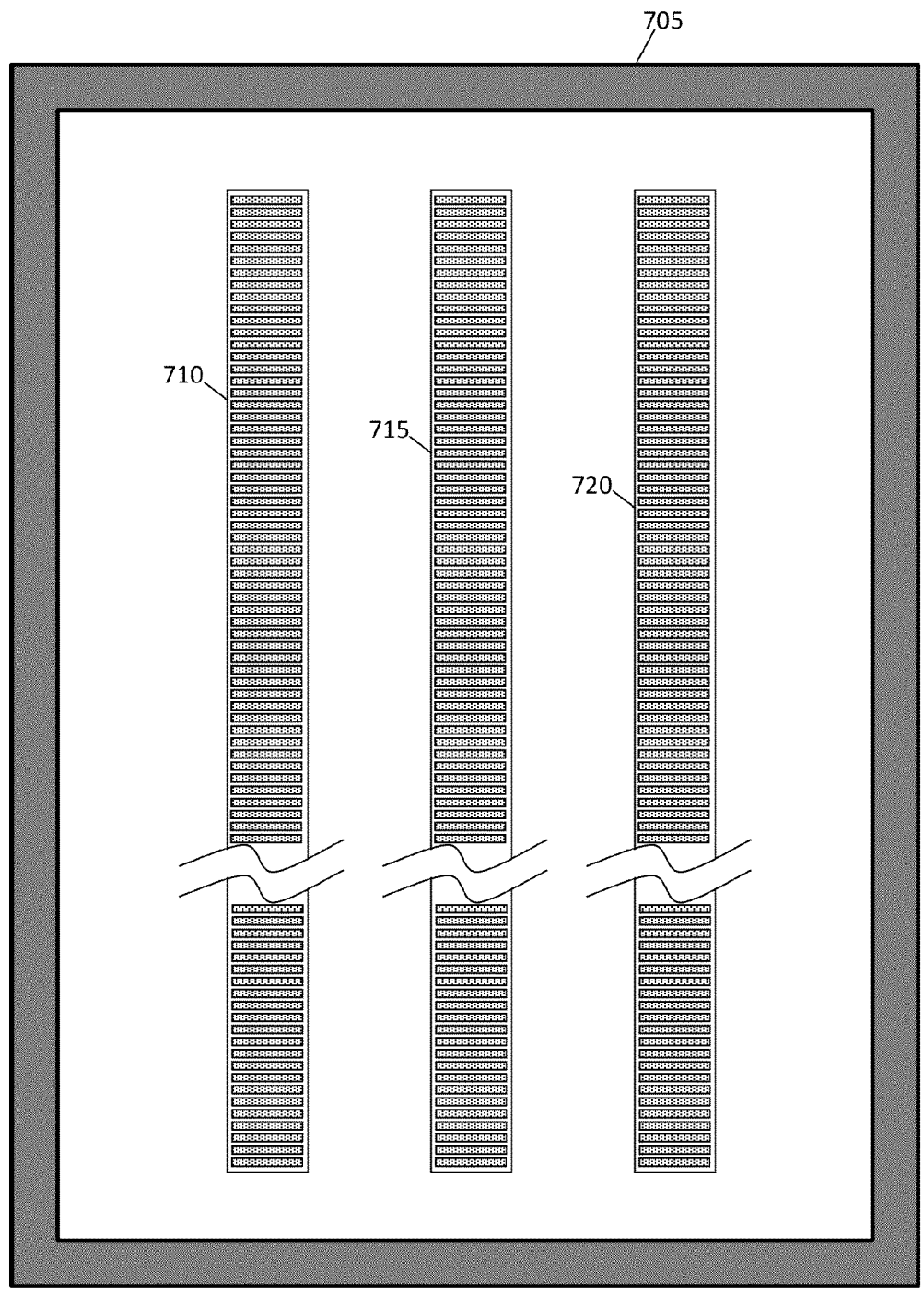
FIG. 7 shows a triple-linear-array MEMS light modulator chip.
Figure 8:
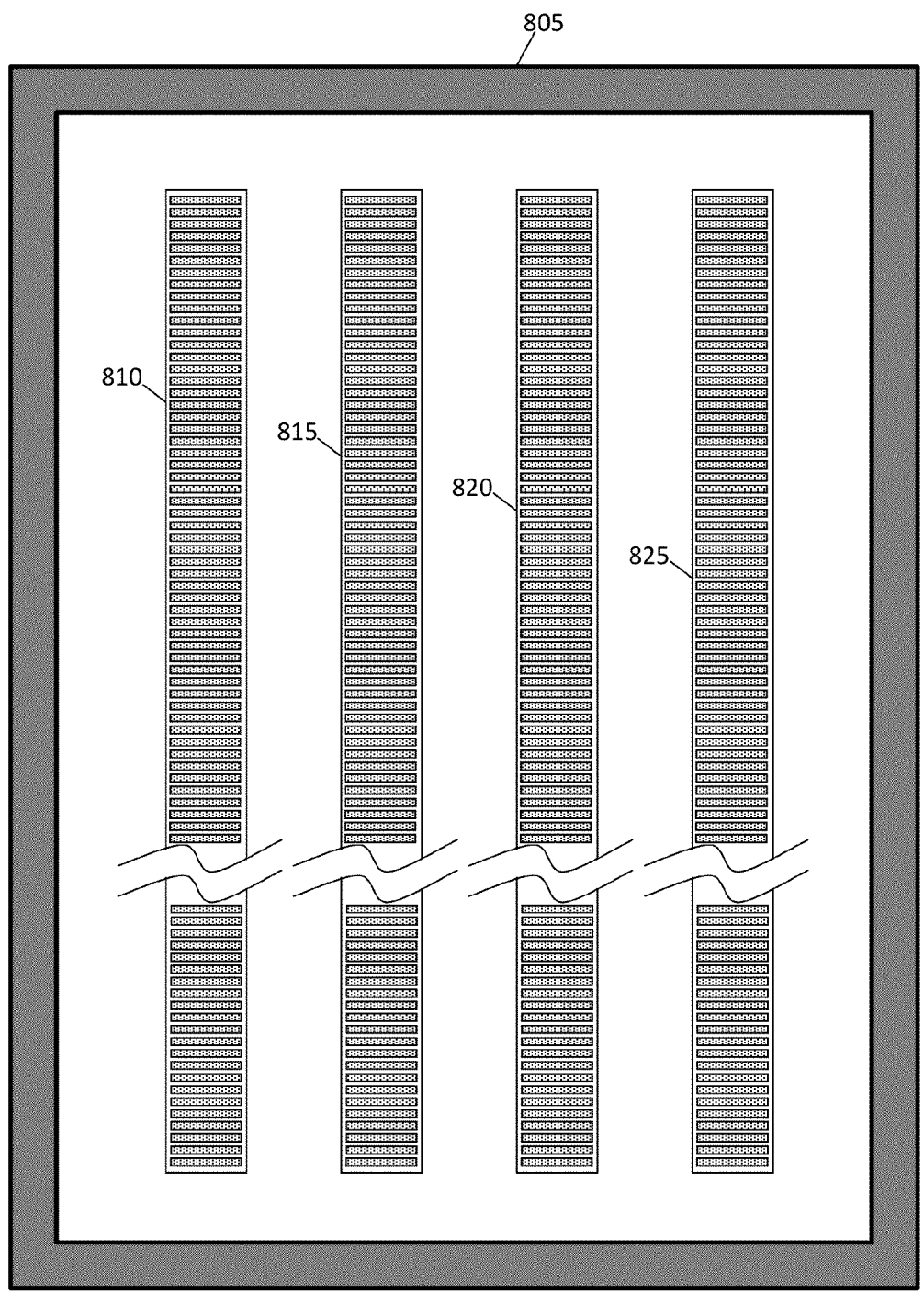
FIG. 8 shows a quadruple-linear-array MEMS light modulator chip.

FIGS. 7 and 8 show triple- and quadruple-linear array MEMS light modulator chips, respectively. The chips shown in FIGS. 7 and 8 are similar to the double-linear-array chip of FIG. 3 except for the increased number of arrays.

In FIG. 7, triple-linear-array chip 705 includes three linear arrays, 710, 715 and 720, while in FIG. 8 quadruple-linear-array chip 805 includes four linear arrays, 810, 815, 820 and 825. All of the arrays of the triple- and quadruple-linear-array chips contain light modulator elements as discussed in connection with FIG. 3. The elements of the arrays may be reflective or transmissive light modulators such as liquid crystals or MEMS mirrors have either piston or tilt motion; however, most of the discussion of array elements is directed toward reflective MEMS ribbons such as those discussed in connection with FIG. 4. Only a few dozen elements per array are shown; however, actual arrays may have as many as several thousand elements.

Triple- and quadruple-linear-array chips may include single layer wiring schemes which permit their fabrication using processes designed for single linear arrays. Only layout, rather than process flow, changes are required. As an example, FIG. 9 shows a single-layer wiring scheme for a quadruple-linear-array MEMS light modulator chip.

Figure 9:
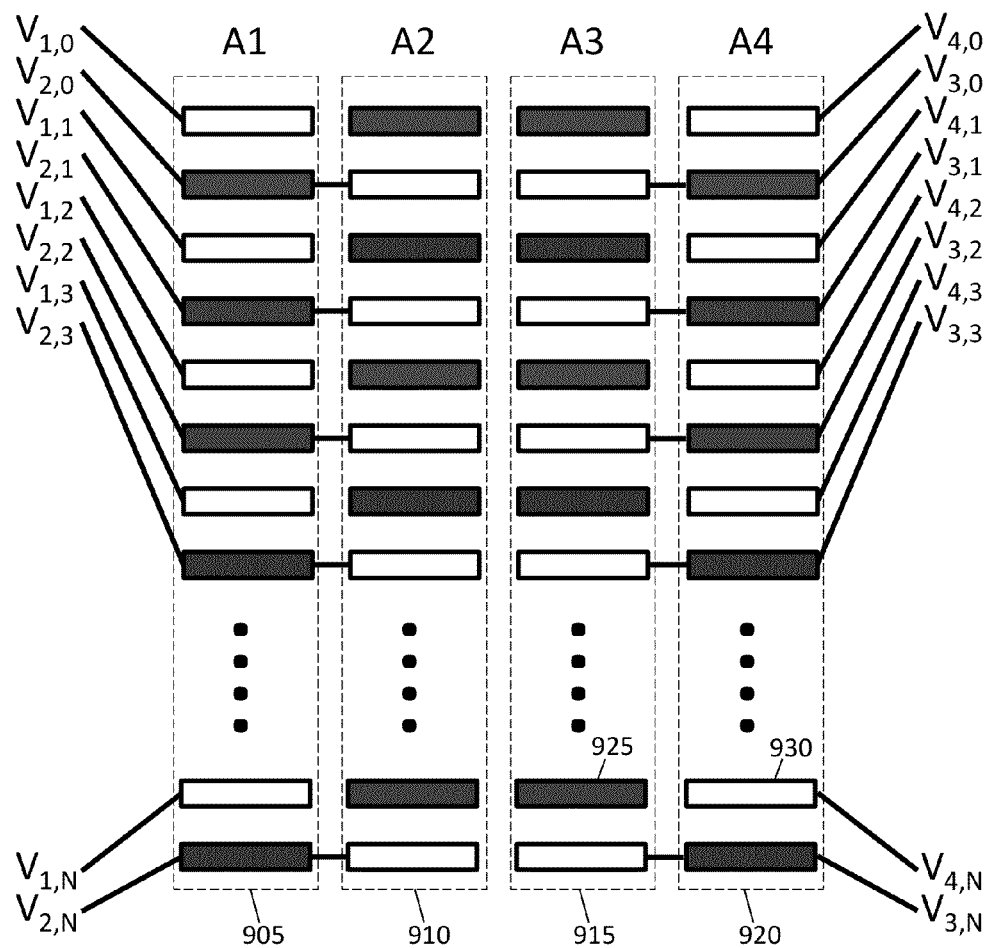
FIG. 9 shows a single-layer wiring scheme for a quadruple-linear-array MEMS light modulator chip.

In FIG. 9, linear array A1 includes ribbons that appear within dashed rectangle 905, and linear arrays A2, A3 and A4 include ribbons that appear within dashed rectangles 910, 915 and 920, respectively. (The spacing between ribbons in the arrays shown in FIG. 9 is exaggerated for clarity.)

In FIG. 9, unfilled rectangles, such as 930, represent ribbons that may be deflected by applying a voltage between them and the chip substrate, as shown, e.g. in FIG. 4B. Shaded rectangles, such as 925, represent ribbons that do not deflect when a voltage is applied between them and the chip substrate, as shown, e.g. in FIG. 4C. The non-deflecting ribbons in arrays A1 and A4 are used as conductors to carry voltages to deflecting ribbons in arrays A2 and A3. This means that every other ribbon in each of arrays A1-A4 can be individually addressed and made to deflect in response to an applied voltage. These ribbons are connected to individual signal lines that carry voltages $V_{1,0}$, $V_{1,1}$, $V_{2,0}$, etc. Here $V_{X,Y}$ is a signal for moveable ribbon Y in array AX. A single layer wiring scheme for a triple-linear-array may be realized by deleting either array A2 or A3 from FIG. 9.

Double-, triple- or quadruple-linear-arrays of MEMS light modulators may thus be fabricated on a single chip using processes developed for single linear array chips. Arrays on a single chip are spaced apart from each other in the y direction (see FIG. 3) by many pixels, often one hundred or more. The array spacing leads to spacing between line images that are scanned to form a two-dimensional image. Effects of this spacing may be compensated by introducing a delay between array configurations for a single column in a two-dimensional image. For example if one array on a chip modulates red line images while another array modulates green line images, then red and green data for a single column in an image with red and green components should be modulated at different times by the two arrays.

Arrays on a single chip may also be offset from each other in the x direction (see FIGS. 3, 6A and 6B). Such offsets may be used to improve image resolution. Whether to offset by one-half or one ribbon pitch depends on the type of modulation performed by the arrays and the type of optical system used to convert that modulation into line images.

A single chip with multiple-linear-arrays per chip may be used as part of a high-resolution monochrome or color display. Choices related to how each array of a multiple-linear-array chip is used affect the available column time for each array. The available column time is the length of time during which a linear array of MEMS modulators is configured for one column of image data. After one column time, the MEMS linear array is reconfigured for the next column of image data.

As an example, if the number of columns to be shown in a two-dimensional image is multiplied by X, then the available column time is divided by X. Showing an image with twice as many columns leaves half the time available to display each one, all other things being equal. Thus MEMS arrays must work faster to display images having more columns of image pixels. More rows of image pixels may be obtained by using linear arrays containing more modulator elements.

If the number of frames of image data shown per second is multiplied by Y, then the available column time is divided by Y. Frames are still images that form a video when shown in rapid succession. Image data, such as the location of objects in an image, may change from frame to frame.

Available column time is reduced by scanner duty factor. A scan mirror, such as 230 in FIGS. 2A and 2B, normally requires a short time to return to a starting position after each scan. Time used up for this "flyback" reduces the available column time. The delay between column data sent to different arrays, which is used to compensate for the arrays' separation in the y direction (e.g. W in FIG. 3), also reduces the available column time.

Available column time is reduced by a factor of three when a single linear array is used to modulate red, green and blue light sequentially for each column in a color display when compared to modulating only one color for a monochrome display. Using two, three or four linear arrays to modulate different colors is a way to increase the available column time. Multiple-linear-arrays per chip can make a single-chip, high-resolution, color video display feasible given limits on the amount of time required to reconfigure MEMS light modulator elements.

Figure 10:
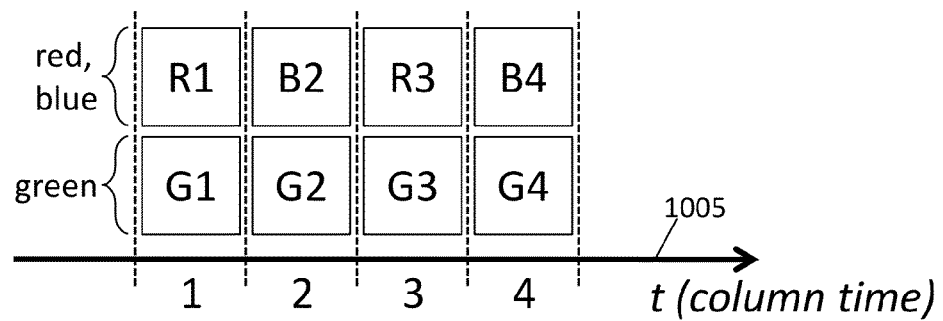
FIG. 10 illustrates a first timing scheme for sending column data to a double-linear-array MEMS light modulator chip.

FIG. 10 illustrates a first timing scheme for sending column data to a double-linear-array MEMS light modulator chip. In this "drop" timing scheme one array of a double-linear-array chip modulates one color while the other array modulates two other colors. A common example is one array dedicated to green with the other dedicated to red and blue.

In FIG. 10, time axis 1005 is marked in units of column time. The column time is determined by factors such as number of columns displayed in a two-dimensional video image, number of video frames per second, scanner flyback time (or duty factor), and array separation on chip.

In the timing scheme of FIG. 10, one array of a double-array chip is dedicated to green. Boxes marked "G1", "G2", etc. represent green line image data sent to this "green" array that modulates green light. Image data for the green component of one column of a two-dimensional video image is represented by "G1". The green array is configured according to this data during the first column time. During the second column time, the green array is configured according to the "G2" data for the green component of the next column of the video image.

During column time 1, the other array of the double-array chip is configured with line image data "R1" which represents the red component of one column of a two-dimensional video image. The "red/blue" array is illuminated with red light during this time. During column time 2, the red/blue array is configured with line image data "B2" which represents the blue component of the next column of the two-dimensional video image.

In the timing scheme of FIG. 10, the green component of every column in a video image is displayed, but only the red or blue component of every other column is displayed. The red component of column 2 and the blue component of column 3 are dropped, for example. This means that the horizontal resolution of the red and blue components of the video image is only half that of the green component. However, human visual acuity is greater for green than for red or blue, so the perceived image quality may still be acceptable. When compared to a single array modulating red, green and blue sequentially for each column, the "drop" timing scheme of FIG. 10 provides almost three times longer available column time. For a given MEMS modulator technology, e.g. reflective ribbon modulators, this leads to the ability to display a higher resolution or higher frame rate color image with a double-linear-array chip.

Figure 11:
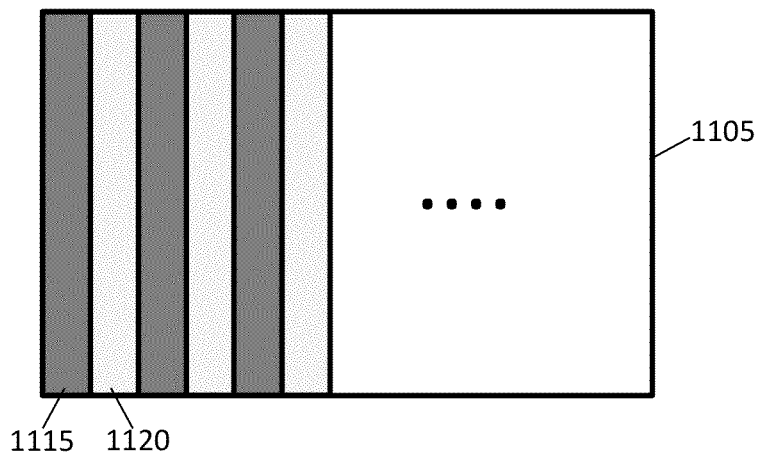
FIG. 11 illustrates a second timing scheme for sending column data to a double-linear-array MEMS light modulator chip.
Figure 11:

FIG. 11 illustrates a second timing scheme for sending column data to a double-linear-array MEMS light modulator chip. In the scheme represented by FIG. 11, red and blue columns are interlaced. Each frame of a video image is divided into two fields. In the first field red and blue columns are shown in order: red, blue, red, blue. In the second field, the order is reversed: blue, red, blue, red.

In FIG. 11, the first of two fields in a video frame is "FIELD 1" 1105 while the second is "FIELD 2" 1110. Within each field dark (e.g. 1115) and light (e.g. 1120) stripes represent red and blue column information, respectively. The order of red and blue columns is reversed from FIELD 1 to FIELD 2. The timing scheme of FIG. 11 provides better red/blue horizontal resolution than the scheme of FIG. 10; however, the available column time is reduced by a factor of two.

Figure 12:
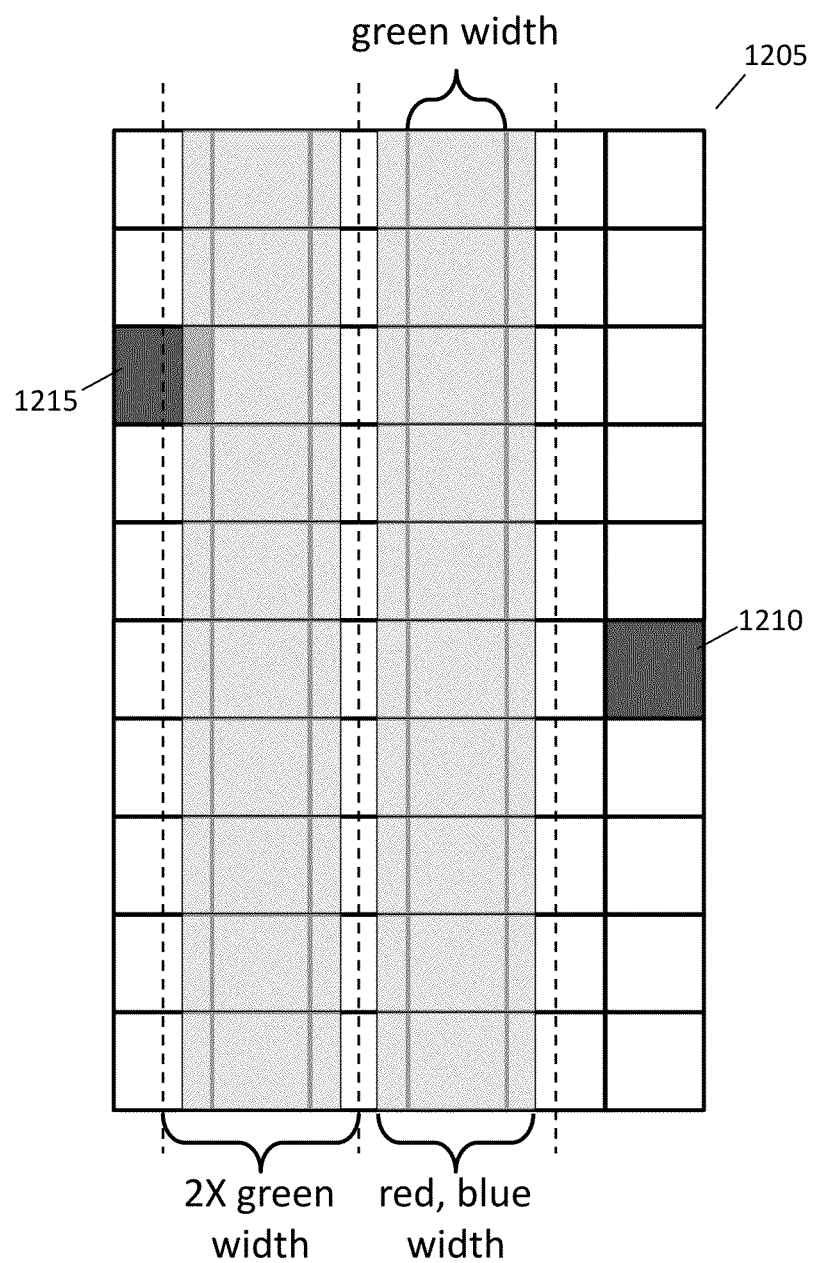
FIG. 12 illustrates pixel width adjustments.

The drop and interlacing timing schemes of FIGS. 10 and 11 may lead to red or blue flicker in some cases. FIG. 12 illustrates pixel width adjustments which are one way to make flicker less noticeable. In FIG. 12, grid 1205 represents six columns of pixels in a video image. Pixels 1210 and 1215 are shaded for emphasis. The height of all pixels is the same. The width of green pixels is shown by "green width". Pixel width adjustments for red or blue pixels make these pixels wider than the green pixels without changing the spacing between pixels. Since alternate columns of red or blue pixels are dropped in the schemes of FIGS. 10 and 11, red and blue pixels may be made up to twice as wide as green ones. This is indicated by "red, blue width" and "2× green width" which is the maximum width for a wide red or blue pixel.

Pixel width adjustments may be made by changing the focus of illumination light on a linear array of light modulators. Lenses 210 and 211 in FIG. 2A, for example, may be used to make such adjustments. Pixel width adjustments do not affect the available column time.

FIG. 11 illustrated how columns in a video display may be interlaced by showing red and blue information for different columns in successive fields of a video frame. Rows may also be interlaced to increase image resolution. For row interlacing, a video frame is divided into two fields offset from one another by half a pixel in the vertical direction, parallel to the columns. The two fields are displayed sequentially and the available column time is reduced by a factor of two.

Row interlacing may be achieved by slightly tilting a scan mirror (e.g. mirror 230 in FIGS. 2) or a modulator chip from one field to the next. Row interlacing may be combined with any combination of the drop, column interlacing or wide pixel techniques described above.

Figure 13:
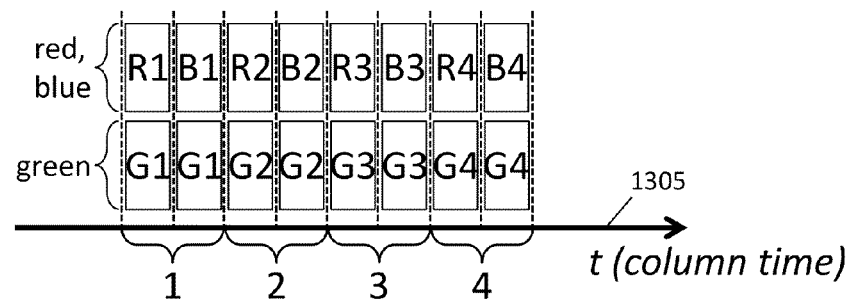
FIG. 13 illustrates a third timing scheme for sending column data to a double-linear-array MEMS light modulator chip.

FIG. 13 illustrates a third timing scheme for sending column data to a double-linear-array MEMS light modulator chip. In this scheme, no color information is dropped, but the column time available for the red/blue modulator is half that for the green modulator. FIG. 13 is similar to FIG. 10; time axis 1305 is marked in units of column time. In FIG. 13, however, a red line image is displayed for the first half of each green column time and a blue line image is displayed for the second half. The "red, blue" row in the figure shows red information for column 2 displayed during the first half of column time 2 and blue information for column 2 displayed during the second half of column time 2.

In the timing scheme of FIG. 13, a red line image for each column is displayed before a blue line image for the same column. These images will be separated from one another because they are generated at different times just as line images 235, 236 from different arrays are separated in FIG. 2B. In the case of the timing scheme of FIG. 13, called "red/blue sequential" timing, however, the separation is small, usually just a few pixels.

Figure 14:
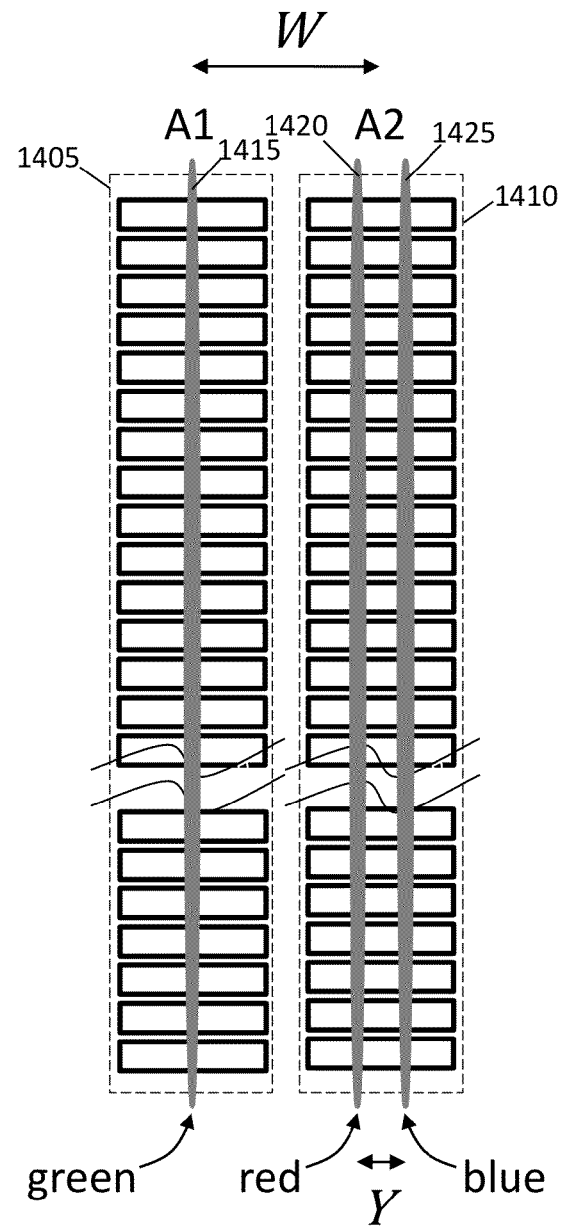
FIG. 14 illustrates an illumination scheme for a double-linear-array MEMS light modulator chip.

FIG. 14 illustrates an illumination scheme for a double-linear-array MEMS light modulator chip that removes the red/blue separation when red/blue sequential timing is used. FIG. 14 shows two linear arrays A1 1405 and A2 1410 of a double-linear-array chip. Similar to the arrays discussed in connection with, e.g. FIG. 3 above, each array contains as many as several thousand modulator elements. Array A1 is illuminated with a thin stripe of green light 1415 while array A2 is illuminated with a thin stripe of red light 1420 and a thin stripe of blue light 1425.

The separation between arrays A1 and A2 is W, while the separation between the red and blue stripes of light is Y. If the delay between red and blue line images in a red/blue sequential timing scheme is a certain number of pixels, then the spacing Y between red and blue illumination stripes on array A2 can be adjusted by the same number of pixels to superimpose red and blue line images. The red/blue delay and corresponding spacing Y, may be less than one pixel size.

Array A2 may be thought of as two arrays separated by Y with each array available only half the time. Red/blue sequential timing with a double-linear-array chip increases the available column time by about 40% compared to using one array for red, blue and green sequential column color. Given a fixed MEMS modulator reconfiguration time, this increase in available column time can be used to increase the number of columns in a video image, the frame rate, or both.

MEMS light modulator chips having multiple linear arrays of light modulators offer a way to produce high-resolution, high-frame rate video from a single-chip display system. Various timing schemes may be used to display three colors using two linear arrays. Similar methods may be used to display four colors using three linear arrays, for example. The specific methods used depend on color and resolution requirements of each potential application.

Although many of the examples above are presented in terms of one array in a double-array chip handling green while the other handles red and blue, different colors may be assigned to different arrays. Multiple-linear-array chips may also be used to improve resolution of monochrome displays.

The above description of the disclosed embodiments is provided to enable any person skilled in the art to make or use the disclosure. Various modifications to these embodiments will be readily apparent to those skilled in the art, and the principles defined herein may be applied to other embodiments without departing from the scope of the disclosure. Thus, the disclosure is not intended to be limited to the embodiments shown herein but is to be accorded the widest scope consistent with the principles and novel features disclosed herein.

What is claimed is:

1. A light modulator chip comprising:
   two linear arrays of micro-electromechanical light modulator elements integrated on the chip, the arrays parallel to each other and separated from one another in a direction perpendicular to the longest array dimension.

2. The chip of claim 1 where movable elements in each array are addressed by a single layer of wiring that provides direct connection to each element.

3. The chip of claim 1 where the arrays are offset from one another in a direction parallel to the longest array dimension.

4. The chip of claim 1 where the light modulator elements are reflective micro-electromechanical ribbons comprising silicon nitride.

5. The system of claim 1 further comprising:
   a third linear array of micro-electromechanical light modulator elements integrated on the chip, the third array parallel to the other two and separated from the other two in a direction perpendicular to the longest array dimension.

6. The system of claim 5 further comprising:
   a fourth linear array of micro-electromechanical light modulator elements integrated on the chip, the fourth array parallel to the other three and separated from the other three in a direction perpendicular to the longest array dimension.

7. A display system comprising:
   a first light source that illuminates a single-chip, multiple-linear-array, micro-electromechanical light modulator;
   an optical system that converts light modulated by the multiple-linear-array light modulator into multiple line images; and,
   a scan mechanism that scans the multiple line images simultaneously to form a two-dimensional image.

8. The system of claim 7, where the multiple-linear-array, micro-electromechanical light modulator comprises two, and only two, linear arrays of micro-electromechanical light modulator elements integrated on the chip.

9. The system of claim 7, where the multiple-linear-array, micro-electromechanical light modulator comprises three, and only three, linear arrays of micro-electromechanical light modulator elements integrated on the chip.

10. The system of claim 7, where the multiple-linear-array, micro-electromechanical light modulator comprises four, and only four, linear arrays of micro-electromechanical light modulator elements integrated on the chip.

11. The system of claim 7 further comprising a second light source that illuminates the multiple-linear-array light modulator.

12. The system of claim 11 where the first light source is focused to a first thin strip of light that illuminates a first array of the multiple-linear-array light modulator and the second light source is focused to a second thin strip of light that illuminates a second array of the multiple-linear-array light modulator.

13. The system of claim 12 where the first and second thin strips of light have different widths.

14. The system of claim 11 further comprising a third light source that illuminates the multiple-linear-array light modulator.

15. The system of claim 14 where the first light source is focused to a first thin strip of light that illuminates a first array of the multiple-linear-array light modulator, the second light source is focused to a second thin strip of light that illuminates a second array of the multiple-linear-array light modulator and the third light source is focused to a third thin strip of light that illuminates the second array of the multiple-linear-array light modulator.

16. The system of claim 15 where the second and third thin strips of light are separated from one another on the second array.

17. A method of displaying a video image having columns of pixels comprising:
   providing a display based on a single-chip, multiple-linear-array, micro-electromechanical light modulator; and,
   (a) configuring a first linear array of the single-chip modulator to modulate a first color component of a first column of the video image;
   (b) configuring a second linear array of the single-chip modulator to modulate a second color component of the first column of the video image;
   (c) configuring the first linear array of the single-chip modulator to modulate the first color component of a second column of the video image;
   (d) configuring the second linear array of the single-chip modulator to modulate a third color component of the second column of the video image; and,
   (e) for successive columns after the second, alternately configuring the second linear array of the single-chip modulator to modulate the second and third color components on a column by column basis.

18. A method of displaying a video image having columns of pixels comprising:
   providing a display based on a single-chip, multiple-linear-array, micro-electromechanical light modulator; and,
   for each frame of video data:
   (a) configuring a first linear array of the single-chip modulator to modulate a first color component of a first column of the video image;
   (b) configuring a second linear array of the single-chip modulator to modulate a second color component of the first column of the video image;
   (c) configuring the first linear array of the single-chip modulator to modulate the first color component of a second column of the video image;
   (d) configuring the second linear array of the single-chip modulator to modulate a third color component of the second column of the video image;
   (e) for successive columns after the second, alternately configuring the second linear array of the single-chip modulator to modulate the second and third color components on a column by column basis; and,
   (f) repeating steps (a) through (e) with the roles of the second and third color components reversed.

19. A method of displaying a video image having columns of pixels comprising:
   providing a display based on a single-chip, multiple-linear-array, micro-electromechanical light modulator; and,
   for each column of video data:
   (a) configuring a first linear array of the single-chip modulator to modulate a first color component of the column of the video image during a column time;

(b) configuring a second linear array of the single-chip modulator to modulate a second color component of the column of the video image during a first part of the column time; and, (c) configuring the second linear array of the single-chip modulator to modulate a third color component of the column of the video image during a second part of the column time.

\* \* \* \* \*